(12) United States Patent
Lemus et al.

(10) Patent No.: US 8,862,733 B2
(45) Date of Patent: Oct. 14, 2014

(54) USER-BASED PRIORITIZATION FOR CONTENT TRANSCODING

(75) Inventors: Anthony Marco Lemus, Irving, TX (US); Zhiying Jin, Lexington, MA (US); Xuefeng Yao, Waban, MA (US); Aravind Perumandla, Irving, TX (US); Chukuemeka Okonkwo, Irving, TX (US); Velmurugan Krishnaswamy, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 750 days.

(21) Appl. No.: 12/848,061

(22) Filed: Jul. 30, 2010

(65) Prior Publication Data

US 2012/0030376 A1    Feb. 2, 2012

(51) Int. Cl.
    *G06F 15/173*      (2006.01)
    *H04N 19/40*      (2014.01)
    *H04N 19/162*      (2014.01)

(52) U.S. Cl.
    CPC .............. *H04N 19/0023* (2013.01); *H04N 19/00472* (2013.01)
    USPC ........................................ 709/225; 709/223

(58) Field of Classification Search
    CPC ............... H04N 19/00472; H04N 19/0023
    USPC .............. 709/225, 246, 203, 217, 219, 223
    See application file for complete search history.

(56) References Cited

U.S. PATENT DOCUMENTS

| | | | | |
|---|---|---|---|---|
| 5,991,795 A | * | 11/1999 | Howard et al. | 709/201 |
| 6,061,732 A | * | 5/2000 | Korst et al. | 709/231 |
| 6,122,290 A | * | 9/2000 | Kawamata | 370/466 |
| 6,247,050 B1 | * | 6/2001 | Tso et al. | 709/224 |
| 6,751,673 B2 | * | 6/2004 | Shaw | 709/231 |
| 7,155,475 B2 | * | 12/2006 | Agnoli et al. | 709/201 |
| 7,669,121 B2 | * | 2/2010 | Kiilerich | 715/249 |
| 7,676,590 B2 | * | 3/2010 | Silverman et al. | 709/231 |
| 7,738,766 B2 | * | 6/2010 | Silverman et al. | 386/241 |
| 7,882,258 B1 | * | 2/2011 | Sumler et al. | 709/231 |
| 7,924,913 B2 | * | 4/2011 | Sullivan et al. | 375/240 |
| 7,991,908 B2 | * | 8/2011 | Drogo de Iacovo et al. | 709/232 |
| 8,127,043 B2 | * | 2/2012 | Vecchio et al. | 709/246 |
| 8,610,603 B2 | * | 12/2013 | Lai et al. | 341/51 |
| 8,688,859 B2 | * | 4/2014 | Vecchio et al. | 709/246 |
| 2002/0032777 A1 | * | 3/2002 | Kawata et al. | 709/226 |
| 2002/0069420 A1 | * | 6/2002 | Russell et al. | 725/92 |
| 2003/0112792 A1 | * | 6/2003 | Cranor et al. | 370/352 |
| 2003/0158913 A1 | * | 8/2003 | Agnoli et al. | 709/219 |
| 2003/0233464 A1 | | 12/2003 | Walpole et al. | |
| 2005/0246451 A1 | * | 11/2005 | Silverman et al. | 709/231 |
| 2005/0250509 A1 | * | 11/2005 | Choksi | 455/452.1 |
| 2006/0161538 A1 | | 7/2006 | Kiilerich | |

(Continued)

*Primary Examiner* — Jimmy H Tran

(57) ABSTRACT

A system may include a server device. The server device may receive, from a device, a media item in a first format associated with the device, and determine a transcoding priority to be associated with transcoding of the media item based on information regarding a transcoding job request for one or more other media items received from the user and at least one of information associated with the media item or information associated with a user of the device. The server device may also select, based on the transcoding priority and at least one of the information associated with the media item or the information associated with the user, the media item, from among a number of media items, associated with one or more users, to be transcoded, and transcode the media item to a transcoded media item in a second format that is different than the first format.

19 Claims, 8 Drawing Sheets

(56) References Cited

U.S. PATENT DOCUMENTS

| | | |
|---|---|---|
| 2006/0232448 A1 | 10/2006 | Silverman et al. |
| 2007/0081554 A1* | 4/2007 | Saffre .......................... 370/468 |
| 2007/0233291 A1* | 10/2007 | Herde et al. .................... 700/91 |
| 2008/0052415 A1 | 2/2008 | Kellerman et al. |
| 2008/0270567 A1 | 10/2008 | Stiers et al. |
| 2009/0172685 A1* | 7/2009 | Shavit .......................... 718/103 |
| 2010/0031149 A1* | 2/2010 | Gentile et al. ................ 715/723 |
| 2010/0131674 A1* | 5/2010 | Vecchio et al. ............... 709/246 |

* cited by examiner

USER-BASED PRIORITIZATION FOR CONTENT TRANSCODING

BACKGROUND

The advent of technology has fostered a proliferation of devices that may be compatible with content in one format, while being incompatible with content in another format. As such, content, in a particular format, may be shared between devices that are compatible with the particular format. For example, a device may typically be able to share content, having a particular format, with another device that is compatible with the particular format. However, in many instances, a device, associated with content in a particular format, may not be able to easily share that content with another device that is incompatible with the particular format.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

An implementation, described herein, may include system(s) and/or method(s) that may facilitate the prioritization of transcoding of content and the selection of transcoding tasks to perform based on information associated with the content and/or information associated with a user from which the content was received (e.g., via upload of the content). In one example, the content may be an item of media content. The term "transcoding," as used herein, may refer to the conversion or changing of one encoding standard to another. For example, the content may be received in a first format, and may be transcoded to one or more different formats. The first format may be a format associated with a device from which the content is received, and the one or more different formats may be formats associated with one or more other devices. The other devices may be different than or similar to the device from which the content is received.

As used herein, the terms "item of media content" and "item of multimedia content" (hereinafter "media item") may refer interchangeably to an image file, an audio file, a video file, a graphics file, a text file, any combination thereof, or another type or arrangement of data.

Figure 1:
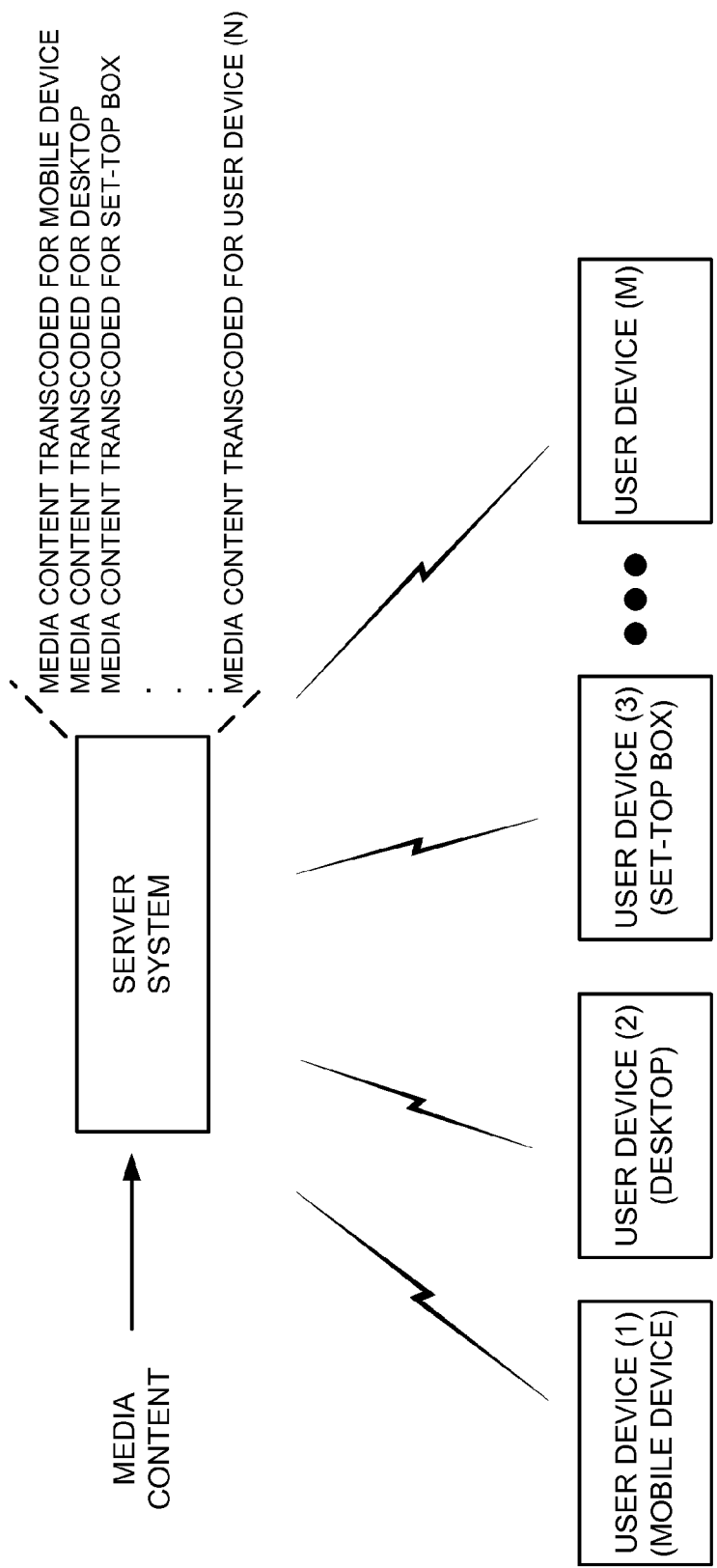
FIG. 1 illustrates an overview of receiving a media item and transcoding the media item into different formats, based on a transcoding priority, according to an example embodiment.

FIG. 1 illustrates an overview of receiving a media item and transcoding the media item into different formats, based on a transcoding priority. FIG. 1 illustrates a server system that receives a media item. For example, the media item may be received from a device associated with a user via an upload. In one instance, a user may transmit the media item, to the server system, using a user interface. For example, the user interface may be a graphical user interface that may include a network browser, such as a web-based browser. The user may also access the server system, using the interface, to receive access to the media item and the different transcoded formats of the media item (hereinafter collectively referred to as "transcoded media items" or individually as "transcoded media item"), following the transcoding of the media item.

The server system may determine a transcoding priority that is to be assigned to transcoding the media item, and assign the determined transcoding priority to the transcoding of the media item. The server system may also select a media item, from among one or more media items that are to be transcoded, for transcoding. For example, the server may assign a particular priority to the transcoding of the media item, select the media item, from one or more media items that are assigned the same priority or different priorities, for transcoding, and transcode the media item based on the particular priority. The server system may determine the transcoding priority for the media item and/or select the media item based on various factors, such as information associated with the media item, information associated with the user from which the media item was received, and/or information associated with a request to transcode a media item (hereinafter "transcoding job request") that is pending for the user. In one implementation, a factor (or set of factors) used by the server system to determine the transcoding priority for a media item may be different than a factor (or a set of factors) used by the server system to select a media item for transcoding.

In one implementation, the information associated with the media item may include a type of the media item, a size of the media item, a duration of the media item, and/or a format in which the media item was received. The information associated with the media item may be included in metadata associated with the media item. The information associated with the user may include user identification information, a quantity of media items received from the user, a frequency of usage of the server system by the user, a recency of usage of the server system by the user, a quantity of services (of a service provider that may be associated with server system) to which the user subscribes, a location associated with the user when the media item was received, information associated with a device associated with the user (hereinafter "device information"), a transcoding format specified by the user, other information relating to transcoding format, and/or other information associated with the user.

In one example, the device information may include information associated with a device that is associated with another user (e.g., a spouse, a child, a co-worker, a friend, etc.). For instance, the user may desire to share a media item with the other user. The device information may also include information associated with a device from which the media item was received. In one example, the recency of usage of the server system may include information relating to a date and/or a time of upload of a media item.

The server system may transcode the media item, from a first format associated with the device from which the media item was received, based on the determined priority assigned to the media item, to a number of different formats. In some embodiments, each of the formats may differ from one another. The different formats may be associated with different types of devices, such as a mobile device, a desktop computer, a set-top box, and/or other devices. For example, the server system may receive the media item, from the device, in a format associated with the device. The server system may then determine a transcoding priority for the media item, assign the transcoding priority to the media item, and transcode the media item, based on the assigned transcoding priority, to a number of different formats. The different formats may include one or more mobile device formats, one or more desktop formats, one or more laptop formats, one or more set-top box formats, and/or one or more other formats associated with one or more other devices.

As illustrated in FIG. 1, for example, the server system may transcode the media item to a transcoded media item in a format associated with a mobile device, a transcoded media item in a format associated with a desktop computer, a transcoded media item in a format associated with a set-top box, etc., and may store the transcoded media items. Accordingly, although the media item was received in a format associated with a particular device, transcoding the media item, into a number of different formats, may allow the content of the media item to be accessible by other devices.

The server system may transmit a notification to the user when the transcoding of the media item is completed. The server system may transmit the notification to the device, of the user from which the media item was received, and/or to another device associated with the user. In one embodiment, the received media item may be accessible to a user prior to completion of the transcoding of the media item. The server system may allow a user, from which the media item was received, to share the media item and the transcoded media items with one or more users. For example, the user may designate one or more users with which the media item and/or the transcoded media items may be shared. The server system may also allow users to browse and/or search the media item and the transcoded media items.

Figure 2:
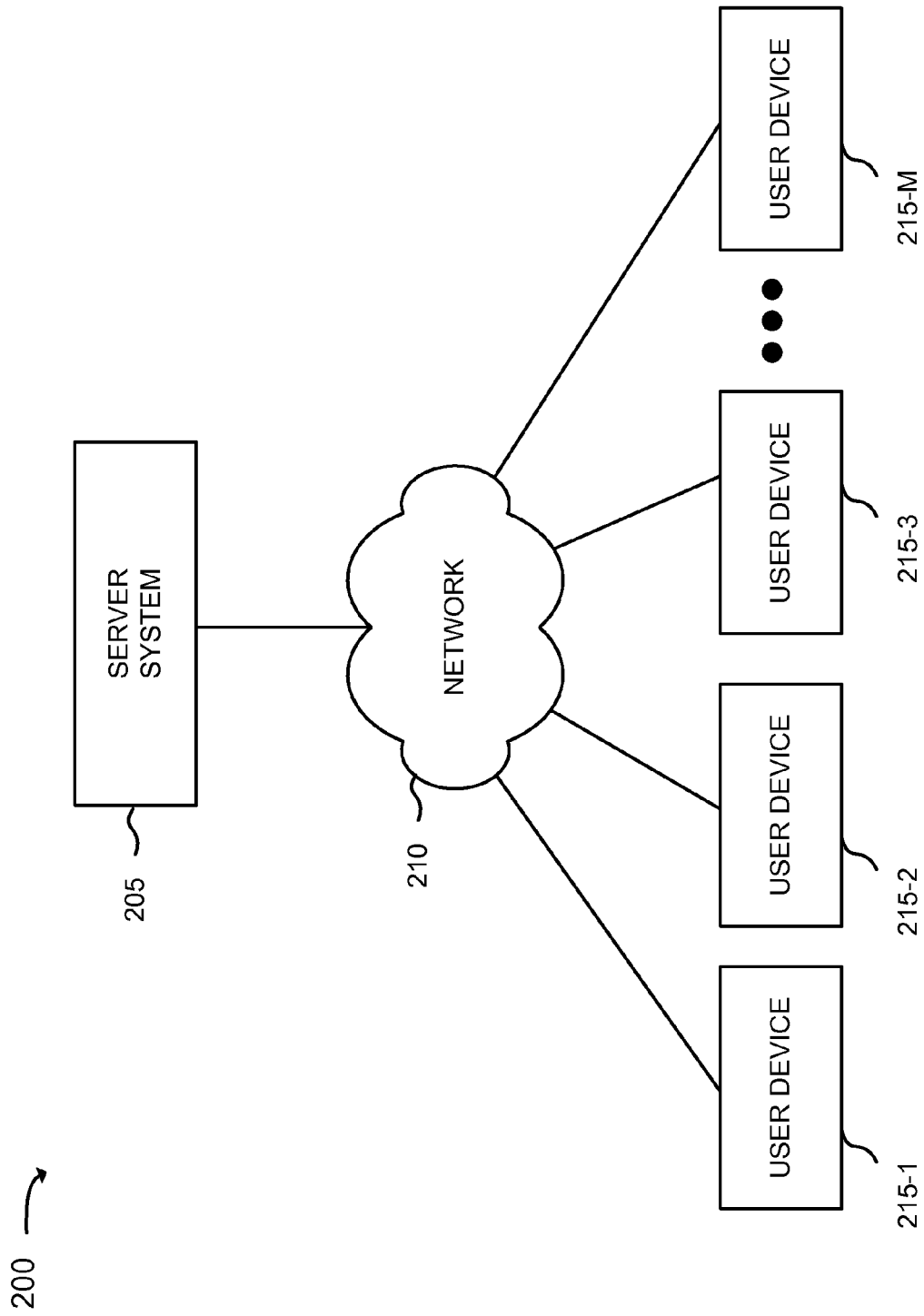
FIG. 2 is a diagram of an example network in which system(s) and/or method(s) described herein may be implemented.

FIG. 2 is a diagram of an example environment 200 in which system(s) and/or method(s) described herein may be implemented. As shown in FIG. 2, environment 200 may include server system 205, network 210, and user devices 215-1, 215-2, 215-3, . . . , 215-M (where M>1) (collectively referred to as "user devices 215" and individually as "user device 215"). In practice, environment 200 may include additional, fewer, different, or differently arranged devices than are shown in FIG. 2. Also, two or more of these devices may be implemented within a single device, or a single device may be implemented as multiple, distributed devices.

Server system 205 may include components as will be explained in more detail below. For example, server system 205 may include a server device, a storage device, or other devices. Server system 205 may receive a media item from a device (e.g., user device 215), determine a transcoding priority to be associated with the transcoding of the media item, select a media item, from one or more media items to be transcoded, for transcoding based on the transcoding priority, and transcode the selected media item, as will be described in more detail below. In one instance, the media item may be received directly from the device or received via a network from the device. For example, the media item may be received as an upload by a user via the device.

Server system 205 may determine a transcoding priority to be associated with the transcoding of a media item based on various factors, such as information associated with a transcoding job request that is pending (hereinafter "pending transcoding job request") for a user from which the media item was received, information associated with the media item, and/or information associated with the user. Server system 205 may also select a media item, from one or more media items to be transcoded, for transcoding based on various factors, such as the information associated with the media item, and/or the information associated with the user. In one instance, server system 205 may automatically (e.g., without request from the user) obtain the information associated with the user. For example, the information may be obtained based on an interaction of the user with server system 205. In one implementation, the user may specify whether server system 205 is allowed to automatically obtain information associated with the user. The user may also transmit the information to server system 205.

Server system 205 may transcode the selected media item. When transcoding the media item, server system 205 may convert the media item from a first format, associated with the device from which the media item was received, into another format that may be accessible by another device. The formats, to which the media item is transcoded, may be based on information associated with the media item, information associated with the user from which the media item was received, and/or information relating to transcoding formats maintained by server system 205 (hereinafter "server transcoding information"). The information associated with the media item, the information associated with the user, and/or the server transcoding information may be stored in a memory that is locally and/or remotely associated with server system 205. The information associated with the media item may include a format of the media item.

As mentioned above, the information associated with the user may include device information. The device information may include identification information of a device, a format associated with the device, a type of the device, and/or other information associated with the device. In one implementation, server system 205 may identify the format associated with the device based on the identification information associated with the device. The device information may identify a format to which the user desires the media item to be transcoded.

The server transcoding information may include a format associated with a mobile device, a desktop computer, a laptop computer, a set-top box, and/or other devices. In one instance, server system 205 may receive an update of the server transcoding information from a server device, a server system, and/or a user. For example, the update may be received in response to server system 205 transmitting a request to a server device, a server system, and/or a user. As another example, an update of the server transcoding information may be received without server system 205 transmitting the request. In one implementation, server system 205 may receive the update at predetermined periods of time, at random times, or any combination of the above.

Server system 205 may perform audio transcoding, video transcoding, and/or another form of transcoding. Server system 205 may perform one or more functions when transcoding the media item. The functions may include changing a size of the media item (e.g., changing to/from displaying a video or an image in "full screen" mode, changing to/from displaying a video or an image in a default size, changing to/from displaying a video or an image in a size that fits a particular screen size, etc.). Additionally, or alternatively, these functions may include changing the resolution of the media item (e.g., to/from 480i, 480p, 720p, 1080i, 1080p, or some other resolution). Additionally, or alternatively, the functions may include changing the audio quality and/or the number of audio channels. Additionally, or alternatively, the functions may include changing an audio format of the media item (e.g., to/from WAV, MP3, QCP, etc.). Any combination of the above functions may be performed by server system 205. Additionally, or alternatively, other functions may be performed by server system 205, as will be described in further detail below.

Server system 205 may store (or cause to be stored) a media item and transcoded media items in a memory device associated with server system 205. Server system 205 may monitor and/or regulate access to the stored media items. For example, server system 205 may receive information from a user that may cause server system 205 to restrict access to the media item (submitted by and/or associated with the user) and/or corresponding transcoded media items to one or more users. For example, the user may provide information identifying a particular user and/or a group of users to server system 205, and server system 205 may regulate access to the stored media items based on the information provided by the user. In one instance, server system 205 may deny access to the media item to a first user that is excluded from the information provided by the user, and grant access to a second user that is included in the information provided by the user, or vice versa.

Server system 205 may store information associated with a user, as described herein, in a memory associated with server system 205. In one example, a user may be a registered user of server system 205, in which case the user may log into server system 205 prior to transmitting a media item. In another example, a user may not need to log into server system 205 prior to transmitting a media item. The information associated with the user may be included in a user profile that is created by server system 205 (e.g., automatically) or created by the user.

Network 210 may include a network that permits transmission of data between server system 205 and user devices 215. Although network 210 may be illustrated as a single network, network 210 may include more than one network. Network 210 may include a local area network (LAN), a wide area network (WAN) (e.g., the Internet), a telephone network (e.g., the Public Switched Telephone Network (PSTN) or a cellular network), an ad hoc network, a fiber optic network (e.g., a fiber optic service (FiOS) network), or any combination of the above networks. Server system 205 and user devices 215 may connect to network 210 via wired and/or wireless connections.

User device 215 may include any computation or communication device that is capable of transmitting and/or receiving data. For example, user device 215-1 may communicate with server system 205 and/or other user devices 215 to transmit and/or receive a media item. In one instance, user device 215 may include a personal computer, a set-top box, or an Internet-enabled television. In another instance, user device 215 may include a radiotelephone, a personal communications system (PCS) terminal (e.g., that may combine a cellular radiotelephone with data processing and data communications capabilities), a personal digital assistant (PDA), a camera, a personal gaming system, or a personal media player.

Figure 3:
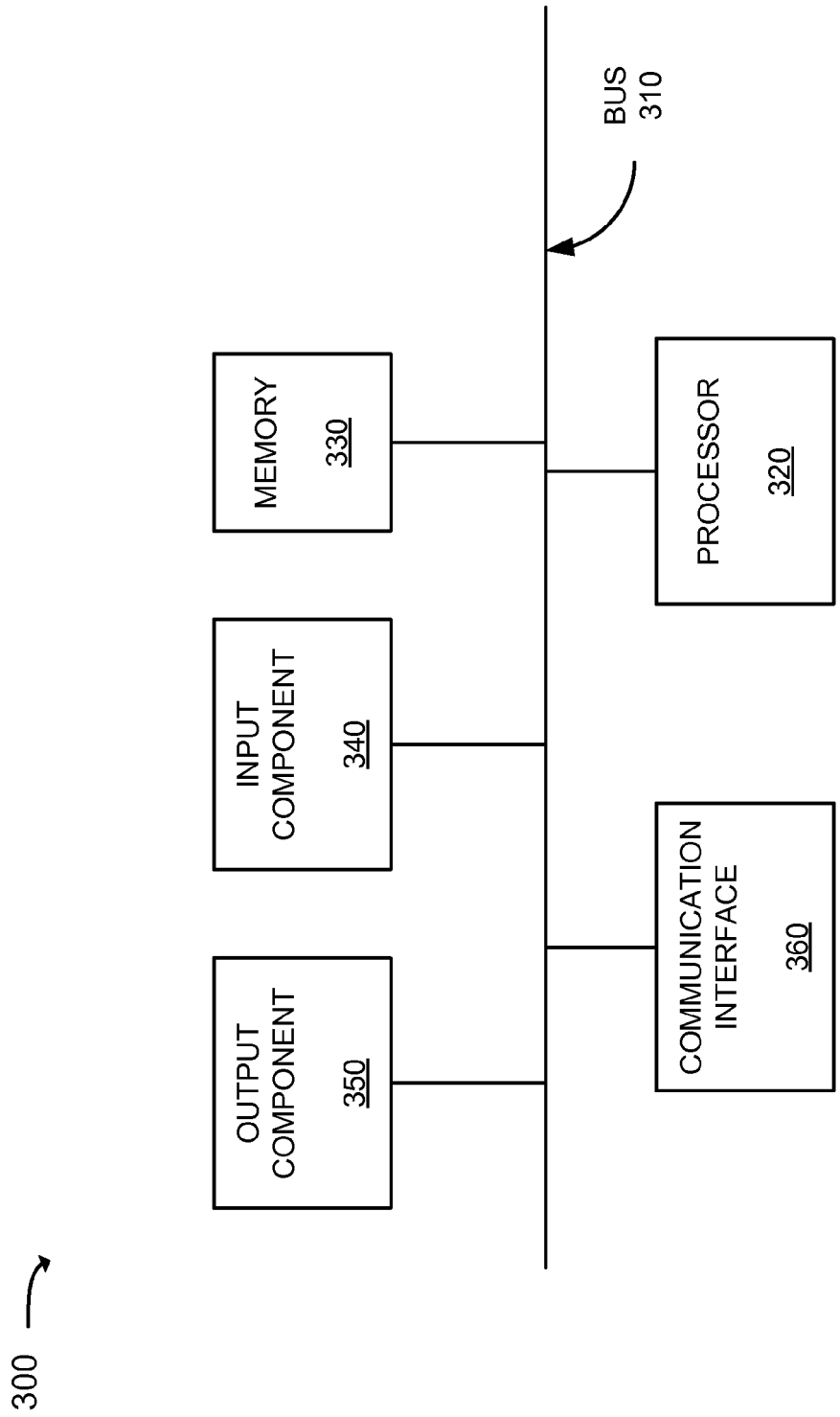
FIG. 3 is a diagram of example components of a device of FIG. 2.

FIG. 3 is a diagram of exemplary components of a device 300. Each of the elements illustrated in FIG. 2 may include one or more devices 300. Device 300 may include a bus 310, a processor 320, a memory 330, an input component 340, an output component 350, and a communication interface 360. In another implementation, device 300 may include additional, fewer, different, or differently arranged components.

Bus 310 may include a path that permits communication among the components of device 300. Processor 320 may include a processor, microprocessor, or processing circuitry that interprets and executes instructions. Memory 330 may include any type of dynamic storage device that stores information and instructions for execution by processor 320, and/or any type of non-volatile storage device that stores information for use by processor 320.

Input component 340 may include a mechanism that permits an operator to input information to device 300, such as a keyboard, a keypad, a button, a switch, etc. Output component 350 may include a mechanism that outputs information to the operator, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, or the like. Communication interface 360 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 300 may include more than one communication interface 360. For instance, device 300 may include an optical interface and an Ethernet interface.

As will be described in detail below, device 300 may perform certain operations relating to transcoding a media item, based on a transcoding priority, and providing access to the received media item and transcoded media items. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
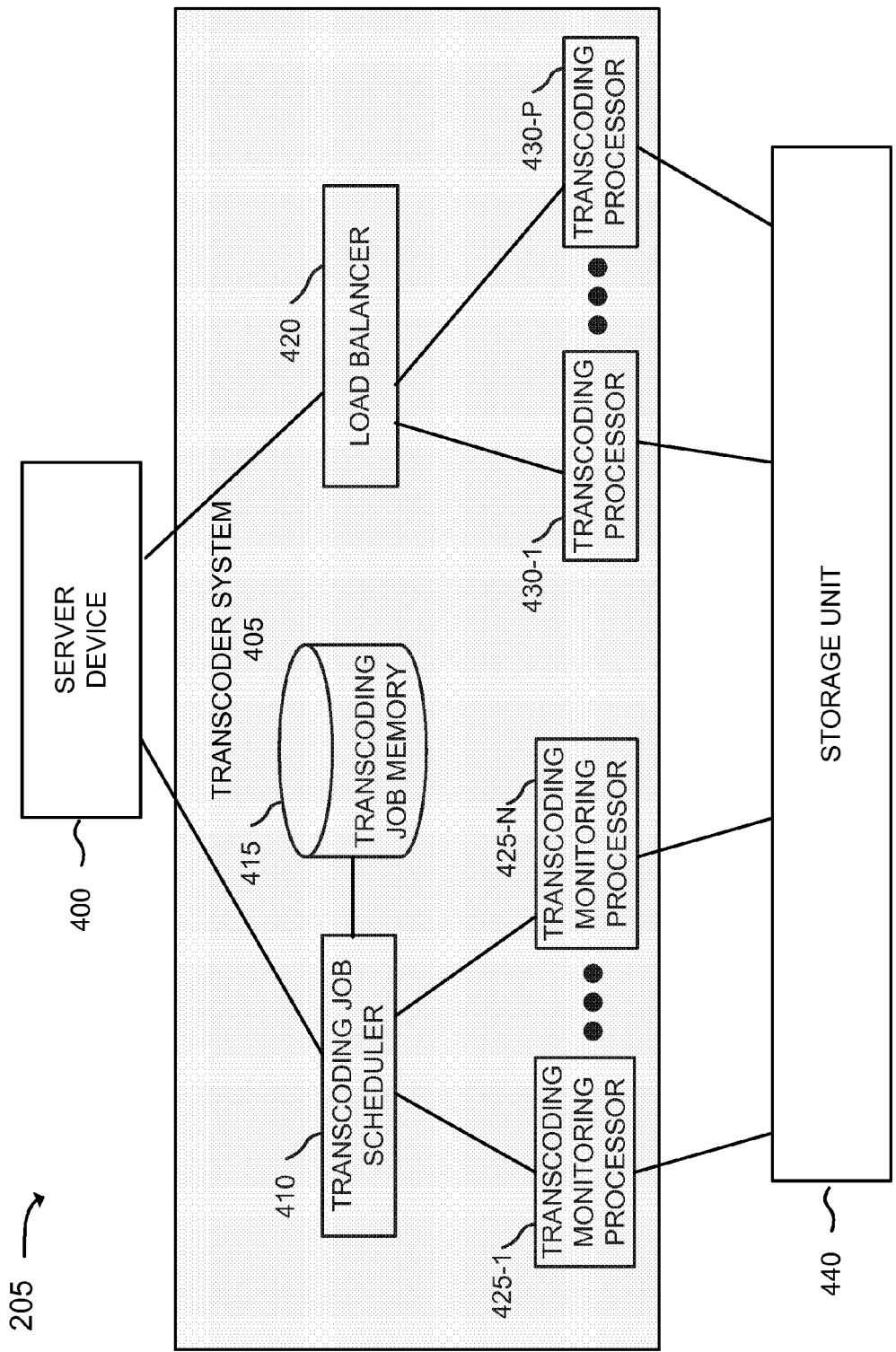
FIG. 4 is a diagram of exemplary components of a server system of FIG. 2.

FIG. 4 is a diagram of example components of server system 205. One or more of the components illustrated in FIG. 4 may include one or more devices 300. Alternatively, or additionally, a single device 300 may include two or more of the components of FIG. 4.

As illustrated, server system 205 may include server device 400, transcoder system 405, and storage unit 440. In another implementation, server system 205 may include additional, fewer, different, or differently arranged components. Transcoder system 405 may include transcoding job scheduler 410, transcoding job memory 415, load balancer 420, transcoding monitoring processors 425-1, . . . , 425-N (where N>1) (collectively referred to as "transcoding monitoring processors 425" or individually as "transcoding monitoring processor 425"), and transcoding processors 430-1, . . . , 430-P (where P>1) (collectively referred to as "transcoding processors 430" or individually as "transcoding processor 430"). In another implementation, transcoder system 405 may include additional, fewer, different, or differently arranged components.

Server device 400 may include a computation or communication device that may gather, process, search, store, and/or provide data in a manner similar to that described herein. In one example, server device 400 may receive a media item, and obtain information associated with the media item. Server device 400 may also obtain information associated with a user, from which the media item was received, in response to receiving the media item. Additionally, or alternatively, server device 400 may cause the media item, a transcoded media item, and/or the information associated with the user to be stored.

Server device 400 may generate a transcoding job request for a media item, and may transmit the transcoding job request to transcoder system 405. The transcoding job request may include information associated with the media item and/or information associated with a user from which the media item was received. Server device 400 may also receive transcoding priority information (hereinafter "priority information"), in response to transmitting the transcoding job request. The priority information may represent one of multiple levels of transcoding priority that can be associated with transcoding the media item.

Server device 400 may select a media item, from among media items that are to be transcoded, for transcoding based on information associated with the media item and/or information associated with a user from which the media item was received. In one implementation, server device 400 may also transmit the media item and priority information associated with the media item to transcoder system 405, and may cause transcoder system 405 to transcode the media item based on the priority information. Server device 400 may receive a notification that a transcoding job request for a media item is completed, and may transmit a message to cause the information associated with the transcoding job request to be updated in a memory (e.g., transcoding job memory 415) when the transcoding job request is completed. Server device 400 may transmit a notification to a user (from which the media item was received), in response to receiving the notification that the transcoding of the media item is completed, to inform the user that the media item and corresponding transcoded media items are available for access by the user and/or one or more other users.

Transcoder system 405 may perform one or more functions associated with transcoding a media item, and storing and providing access to the media item and transcoded media items. Some non-limiting examples of these functions are described below with respect to transcoding job scheduler 410, transcoding job memory 415, load balancer 420, transcoding monitoring processors 425, and transcoding processors 430.

Transcoding job scheduler 410 may receive a transcoding job request, associated with a media item, from server device 400, and may determine a transcoding job priority to be associated with the transcoding job request. Transcoding job scheduler 410 may determine the transcoding job priority for the transcoding job request based on information associated with a pending transcoding job request for a user from which the media item was received, information associated with the media item and/or information associated with the user. Some non-limiting examples of how transcoding job scheduler 410 may determine a transcoding job priority are described in more detail below with respect to FIG. 7.

Transcoding job scheduler 410 may generate priority information based on a transcoding job priority for a transcoding job request, and may assign the priority information to the transcoding job request. In one implementation, transcoding job scheduler 410 may cause the priority information to be stored in transcoding job memory 415, along with information identifying the transcoding job request, and/or information associated with a user (from which a media item, associated with the transcoding job request, was received).

Figure 5:
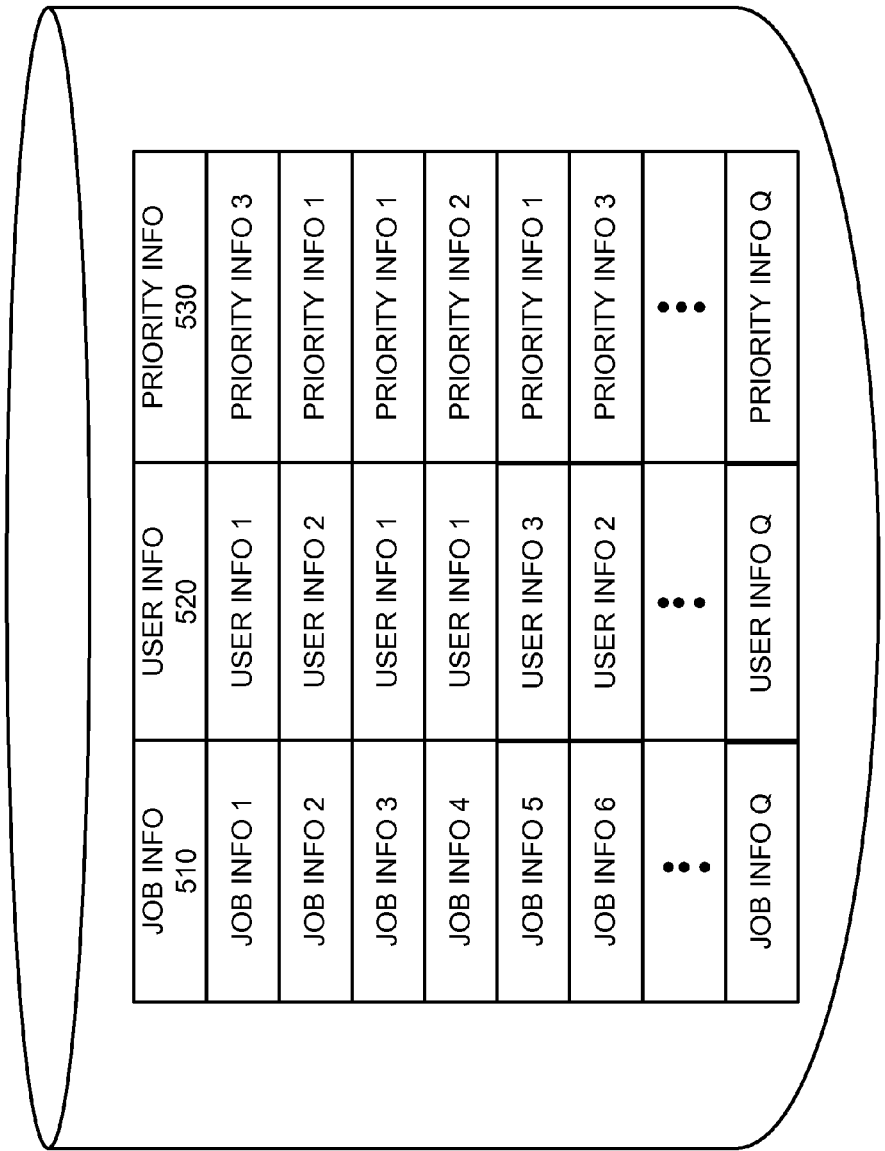
FIG. 5 is a diagram of an example of information, relating to transcoding media items, that is stored in a memory.

FIG. 5 is a diagram of an example of information, relating to transcoding media items, that is stored in transcoding job memory 415. The information is capable of being provided and/or managed by transcoding job scheduler 410. As illustrated, transcoding job memory 415 may include transcoding job information field 510, user information field 520, priority information field 530, and/or a variety of entries associated with fields 510-530.

Job information field 510 may include an entry providing information that uniquely identifies a transcoding job request. User information field 520 may include an entry providing information that uniquely identifies a user from which a media item was received. As illustrated, transcoding job memory 415 may include one or more entries associated with a particular user. Priority information field 530 may include an entry providing information that identifies priority information associated with a transcoding job request. As illustrated, transcoding job memory 415 may include one or more entries associated with particular priority information.

Although FIG. 5 shows example information that may be provided in transcoding job memory 415, in another implementation, transcoding job memory 415 may contain less information, different information, differently arranged information, and/or additional information than depicted in FIG. 5. In one instance, the additional information may be stored in an additional memory. In one example, the additional information may include status information associated with a transcoding job request.

Status information associated with a transcoding job request may include information identifying a status of a transcoding job request. The status information may indicate that the transcoding job request is being processed (e.g., a media item, associated with the transcoding job request, is being transcoded), that the transcoding job request is pending processing (e.g., the media item is not currently being transcoded), or that the transcoding job request is completed (e.g., the media item has been transcoded).

Returning to FIG. 4, transcoding job scheduler 410 may cause information stored in transcoding job memory 415 to be updated. In one implementation, transcoding job scheduler 410 may transmit information to server device 400, and may receive a request from server device 400 to update information stored in transcoding job memory 415.

Load balancer 420 may obtain, from server device 400 (and/or transcoding job memory 415), a media item, priority information associated with a transcoding job request for the media item, information associated with the media item, and/or information associated with a user from which the media item was received. In one implementation, load balancer 420 may select a media item, from media items to be transcoded, for transcoding based on the priority information, the information associated with the media item and/or the information associated with the user. Load balancer 420 may cause the selected media item to be transcoded. Load balancer 420 may also identify a format to which the media item can be transcoded based on information associated with the media item, the information associated with the user, and/or server transcoding information.

Load balancer 430 may identify a transcoding processor 430, and cause that transcoding processor 430 to transcode a media item based on various factors. The various factors may include whether the transcoding processor 430 is active (e.g., operational), inactive (e.g., shut down, for example, for maintenance), an amount of time during which the transcoding processor 430 may remain active, a quantity of task(s)

assigned to the transcoding processor 430, processing resources required by the task(s), and/or other information associated with the transcoding processor 430 or the transcoding job request.

Load balancer 420 may also cause a transcoded media item to be stored. For example, load balancer 420 may cause transcoding processor 430 to store the transcoded media item in storage unit 440.

Transcoding monitoring processor 425 may monitor storage unit 440 to determine, based on the monitoring, whether a transcoding job request is completed. Transcoding monitoring processor 425 may also transmit, to transcoding job scheduler 410, information indicating that the transcoding job request is completed, in response to determining that the transcoding job request is completed. In one implementation, transcoding monitoring processor 425 may determine whether information, indicating that the transcoding job request is completed, is stored in storage unit 440.

Transcoding processor 430 may receive a media item, priority information associated with a transcoding job request for the media item, information associated with the media item, and/or information associated with a user from which the media item was received, and may transcode the media item from a first format to a second format, based on the priority information. The second format may be based on the information associated with the user and/or the information associated with the media item. In one instance, a single transcoding processor 430 may transcode a media item into a number of different formats, while in another instance, transcoding of a media item may be distributed among multiple transcoding processors 430. Transcoding processors 430 may cause the media item and the transcoded media item to be stored in storage unit 440. Transcoding processors 430 may also cause a stored media item to be indexed based on metadata associated with the stored media item.

Storage unit 440 may include any type of dynamic storage device or any type of non-volatile storage device that may store information. For example, storage unit 440 may store a media item received by server device 400 and a transcoded media item transcoded by transcoder system 405. The stored media items may be indexed based on metadata associated with the stored media items. Accordingly, a user may search and/or browse the stored media items based on the metadata. Storage unit 440 may also store information that may provide an indication of a completion of a transcoding job request.

Figure 6:
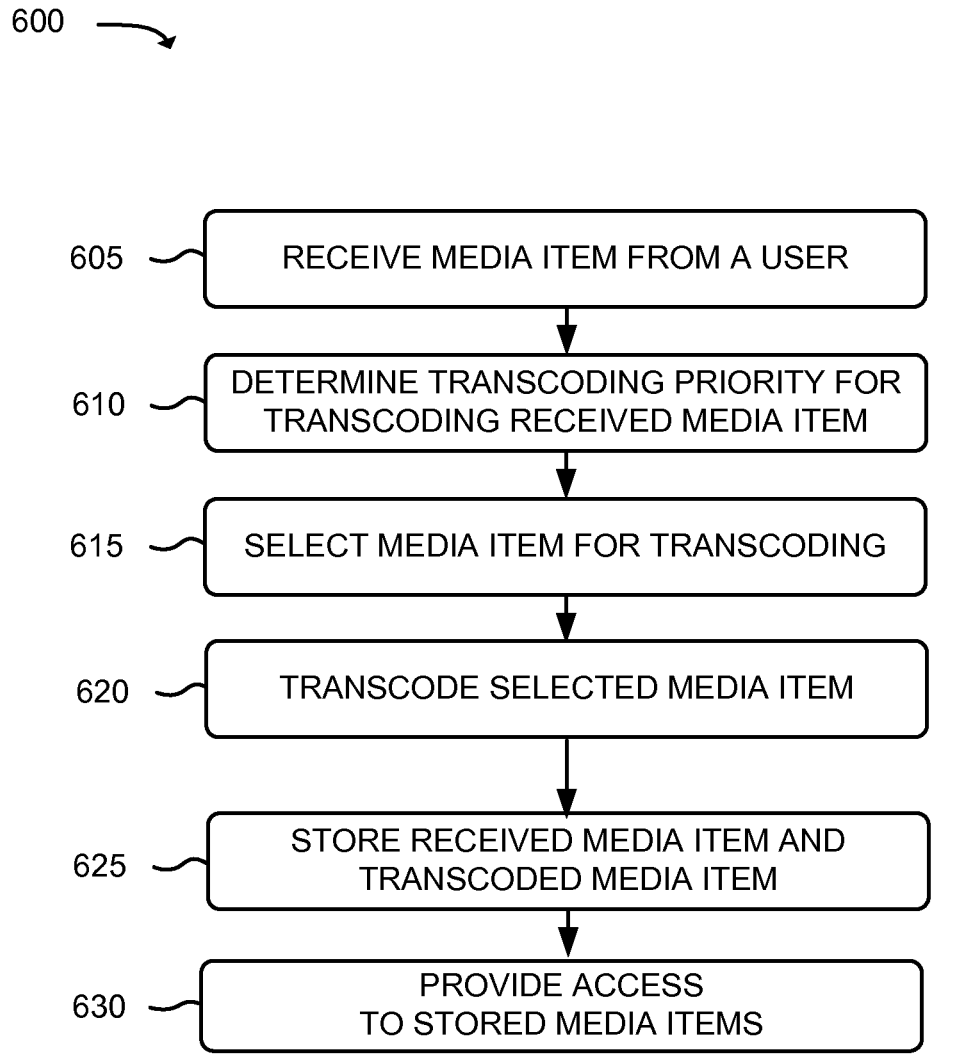
FIG. 6 is a flowchart of an example process for transcoding a media item based on an assigned priority, and providing access to the media item and a transcoded media item.

FIG. 6 is a flow chart of an example process for transcoding a media item based on an assigned priority, and providing access to the media item and transcoded media items, according to an implementation described herein. In one implementation, process 600 may be performed by server system 205. In another implementation, some or all of process 600 may be performed by another device or a group of devices, including or excluding server system 205.

Referring to FIG. 6, process 600 may include receiving a media item from a user (block 605). For example, the user may access server system 205 via a user interface, and transmit the media item to server system 205. In one instance, the media item may be transmitted from a device (e.g., user device 215) to server system 205 via an upload. In one implementation, server device 400 may obtain information associated with the media item and information associated with the user based on receiving the media item. For example, the information associated with the media item may include a type of the media item, a size of the media item, a format in which the media item was received, a duration of the media item, and/or other information that may be associated with the media item. The information associated with the media item may be included in metadata associated with the media item. The metadata may include various information such as, for example, a title of the media item, a description of the media item, an author/producer, a rights holder, a date of creation, and/or other data associated with the media item.

The information associated with the user may include user identification information, a quantity of media items received from the user, a frequency of usage of server system 205 by the user, a recency of usage of server system 205 by the user, a quantity of services (of a service provider that may be associated with server system 205) to which the user subscribes, a location associated with the user when the media item was received, device information, a transcoding format specified by the user, other information relating to transcoding formats, and/or other information associated with the user. In one implementation, the quantity of media items may include the media item that has been received from the user and any other media items that are concurrently or were previously received from the user.

As illustrated, process 600 may include determining a transcoding priority for the media item (block 610). For example, the transcoding priority may be determined by transcoder system 405 based on various factors, such as information associated with a pending transcoding job request for the user, information associated with the media item, and/or information associated with the user. In one implementation, server device 400 may generate a transcoding job request for the media item and send the transcoding job request to transcoding job scheduler 410. For example, the transcoding job request may include the information associated with the media item and/or the information associated with the user from which the media item was received.

Figure 7:
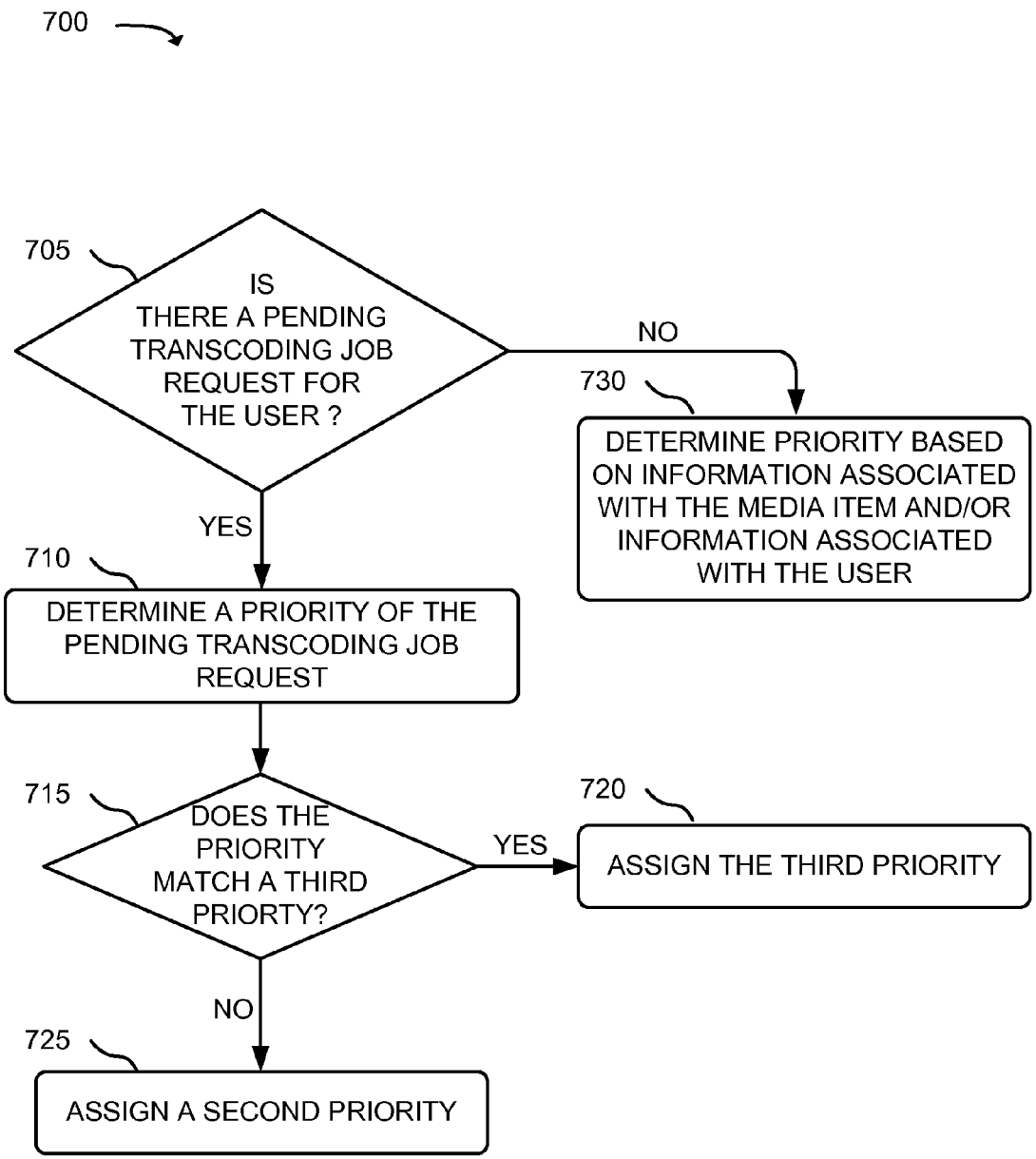
FIG. 7 is a flowchart of an example process for determining and assigning a transcoding priority.

FIG. 7 is a flowchart of an example process 700 for determining and assigning a transcoding priority. Process 700 may include determining whether there is a pending transcoding job request for the user (block 705). In one example, transcoding job scheduler 410 may receive a transcoding job request from server device 400, and determine whether there is a pending transcoding job request for the user by searching a memory, such as transcoding job memory 415 based on the information associated with the user that is included in the received transcoding job request. In one instance, transcoding job scheduler 410 may search the memory based on the information associated with the user, such as the identification information associated with the user. Transcoding job scheduler 410 may obtain information associated with a pending transcoding job request for the user based on a result of the search.

As illustrated in FIG. 7, if there is a pending transcoding job request (block 705—YES), process 700 may include determining a priority associated with the pending transcoding job request (block 710). For example, transcoding job scheduler 410 may identify priority information associated with the pending transcoding job request based on the result of the search. Process 700 may also include determining whether the priority, associated with the pending transcoding job request, matches a third priority (block 715). In the description to follow, it will be assumed that there are three different priority levels: a first priority that corresponds to a high priority level; a second priority that corresponds to a medium priority level; and a third priority that corresponds to a low priority level. In another implementation, there may be more or fewer than three priority levels.

If the priority associated with the pending transcoding job request matches the third priority (block 715—YES), the third priority may be assigned to the received transcoding job request (block 720). If the priority associated with the pending transcoding job request does not match the third priority (block 715—NO), a second priority may be assigned to the received transcoding job request (block 725). As described above, the second priority may correspond to a medium priority level.

In one example, when assigning a priority to the transcoding job request, transcoding job scheduler 410 may store, in a memory, priority information, identification information associated with the received transcoding job request, and identification information associated with the user. Transcoding job scheduler 410 may also store information associated with a status of the transcoding job request. In one implementation, the memory may correspond to transcoding job memory 415. Transcoding job scheduler 410 may also transmit the priority information associated with the transcoding job request to server device 400.

If there is no pending transcoding job request for the user (block 705—NO), process 700 may include determining the priority for the media item based on the information associated with the media item and/or the information associated with the user (block 730). For example, transcoding job scheduler 410 may determine which, of the various factors, is available for the media item, and compare information regarding these factors to particular thresholds to determine the priority to assign to the transcoding job request for the media item. Which factor, or factors, are used by transcoding job scheduler 410 (and in which order) may be set by a system administrator and/or may depend on the type of media item received from the user or the types of media items typically received by users of server system 205. For example, transcoding job scheduler 410 may determine which factors are available, and if more than one factor is available, apply a technique for each factor individually to determine a priority for that factor and combine the priorities for the different factors to calculate the final priority for the transcoding job request for the media item. Alternatively, if more than one factor is available, transcoding job scheduler 410 may apply a technique designed for the factors in combination to determine the priority for the transcoding job request for the media item.

As indicated above, particular thresholds may be used to determine the priority for the transcoding job request for the media item. The particular threshold(s) for one factor may differ from the particular threshold(s) for another factor. When the factor corresponds to the quantity of media items received from the user, the thresholds may relate to quantity thresholds. When the factor corresponds to the duration of a media item, by contrast, the particular thresholds may relate to duration thresholds. Other thresholds may be used for other types of factors.

Assume, for example, that the factor corresponds to the quantity of media items received from the user. In this case, transcoding job scheduler 410 may determine a quantity of media items that has been received from the user based on the information associated with the user. Transcoding job scheduler 410 may determine whether the quantity of media items is less than or equal to a first quantity threshold. For example, if the quantity of media items is less than or equal to the first quantity threshold, transcoding job scheduler 410 may generate priority information corresponding to the first priority and assign the priority information, corresponding to the first priority, to the transcoding job request.

If the quantity of media items is not less than or equal to the first quantity threshold, transcoding job scheduler 410 may determine whether the quantity of media items is less than or equal to a second quantity threshold. For example, if the quantity of media items is less than or equal to the second quantity threshold, transcoding job scheduler 410 may generate priority information corresponding to the second priority and assign the priority information, corresponding to the second priority, to the transcoding job request. If the quantity of media items is not less than or equal to the second quantity threshold, transcoding job scheduler 410 may determine transcoding job scheduler 410 may generate priority information corresponding to a third priority and assign the priority information, corresponding to the third priority, to the received transcoding job request.

In one implementation, the first quantity threshold and the second quantity threshold may be based on a type or a combination of types of the media items received from the user. Accordingly, transcoding job scheduler 410 may determine a type of the media items based on information associated with the media items and information regarding the type of the media items may be used to determine the particular thresholds.

Assume, now, that the factor corresponds to the size of the media item received from the user. For example, in one implementation, transcoding job scheduler 410 may determine the size of the media item based on the information associated with the media item. In one instance, if the size of media item is less than or equal to a first size threshold, transcoding job scheduler 410 may generate priority information corresponding to the first priority and assign the generated priority information to the transcoding job request. In another instance, if the size of media item is not less than or equal to the first size threshold and is than or equal to a second size threshold, transcoding job scheduler 410 may generate priority information corresponding to the second priority and assign the generated priority information to the transcoding job request. In yet another instance, if the size of media item is determined to be greater than the second size threshold, transcoding job scheduler 410 may generate priority information corresponding to the third priority and assign the generated priority information to the transcoding job request.

Returning to FIG. 6, process 600 may include selecting a media item for transcoding (block 615). For example, server device 400 (or load balancer 420) may select a media item, from media items that are to be transcoded, based on various factors, such as those described above. In one implementation, server device 400 may transmit the media item, the priority information, the information associated with the media item, and/or the information associated with the user to load balancer 420. In another implementation, load balancer 420 may obtain, from a memory associated with server system 205, the media item, the priority information, the information associated with the media item, and/or the information associated with the user. There may be many media items, possibly from many different users, assigned each of the different priorities. Server device 400 (or load balancer 420) may select one of the media items, of the media items assigned a particular priority, from one of the users.

Assume that a factor, relating to how frequently a user uses server system 205 (e.g., to upload, search, and/or browse media items), is used to select a media item. In this case, for example, server device 400 (or load balancer 420) may select a media item associated with a user that more frequently uses server system 205 over a media item associated with a user that less frequently uses server system 205. Assume that a factor, relating to how a quantity of services (e.g., an Internet service, a mobile and/or landline telephone service, and/or a television service), provided by a service provider associated with server system 205, to which a user subscribes, is used to select a media item. In this case, for example, server device 400 (or load balancer 420) may select a media item associated with a user that subscribes to more services over a media item associated with a user that subscribes to fewer services. Assume that a factor, relating to a location, from which a media item was received (e.g., a location where server system 205 may be experiencing traffic because a large amount of users are accessing server system 205), is used to select a media item. In this case, for example, server device 400 (or load balancer 420) may select a media item associated with a location of a user, from which the media item was received, where server system 205 is experiencing more traffic over a media item associated with a location of a user, from the media item was received, where server system 205 is experiencing less traffic.

Assume that a factor, relating to a size of a media item, is used to select a media item. In this case, for example, server device 400 (or load balancer 420) may select a media item that has a smaller size over a media item that has a larger size. Assume that a factor, relating to how recently a user used server system 205 (e.g., to upload, search, and/or browse media items), is used to select a media item. In this case, for example, server device 400 (or load balancer 420) may select a media item associated with a user that more recently used server system 205 (e.g., based on a date and/or a time of upload of the media item) over a media item associated with a user that less recently used server system 205. Additionally, or alternatively, a media item may be selected based on any combination of the factors mentioned above.

Accordingly, a transcoding job request of a user may be processed before a transcoding job request, of another user, that is assigned a same or higher priority than the transcoding job request of the user. Assume a user may have multiple transcoding job requests pending, each of which assigned a different priority. In this case, for example, all of the transcoding job requests of the user may be processed before a transcoding request of another user based on one or more of the various factors mentioned above.

As illustrated, process 600 may include transcoding the selected media item (block 625). Load balancer 420 may cause transcoding processor 430 to transcode the media item based on the priority information.

As mentioned above, the formats to which the media item is transcoded may be based on the information associated with the media item, the information associated with the user, and/or server transcoding information. For example, load balancer 420 may cause transcoding processor 430 to transcode the media item to one or more formats based on the information associated with the media item and/or the information associated with the user. Additionally, or alternatively, server device 400 may retrieve the server transcoding information, and send the server transcoding information to load balancer 420. Accordingly, the media item may be, additionally, or alternatively, transcoded based on the server transcoding information. In one instance, load balancer 420 may exclude the format of the media item (in which the media item is received) from the one or more formats to which the media item is to be transcoded.

Process 600 may include storing the media item and a transcoded media item corresponding to the media item (block 625). For example, load balancer 420 may cause transcoding processor 430 to store the media item and the transcoded media item. The media item and the transcoded media item may be stored in storage unit 440. In one instance, the stored media items may be indexed based on metadata associated with the stored media items. In one implementation, the metadata associated with the transcoded media item may include metadata generated by transcoding processors 430, as a result of transcoding the media item, in addition to the metadata originally associated with the media item.

In one implementation, transcoding monitoring processor 425 may determine that the transcoding job request has been completed. For example, transcoding monitor processor 425 may monitor storage unit 440, and identify information, in storage unit 440, indicative of the completion of the transcoding job request. Transcoding monitoring processor 425 may transmit a notification to transcoding job scheduler 410, in response to identifying the information. Transcoding job scheduler 410 may update information associated with the transcoding job request, in response to receiving the notification from transcoding monitoring processor 425. For example, transcoding job scheduler 410 may update an entry in a memory (e.g., transcoding job memory 415), corresponding to the transcoding job request. In one instance, status identification information, corresponding to the transcoding job request, may be updated to indicate that the transcoding job is completed. In another instance, the entry may be deleted. In one instance, the user may have one or more pending transcoding job requests. Accordingly, transcoding job scheduler 410 may also update a priority, associated with a first pending transcoding job request, from the second priority to the first priority, update a priority, associated with a second pending transcoding job, from the third priority to the second priority, and so forth until all the pending transcoding job requests are updated.

Transcoding job scheduler 410 may also transmit a notification to server device 400, in response to receiving the notification from transcoding monitoring processor 425. Server device 400 may, in response to receiving the notification from transcoding job scheduler 410, transmit, to the user, a notification indicative of the completion of the transcoding job request. For example, server device 400 may transmit the notification to the device from which the media item was received or to another device associated with the user, based on the device information.

The notification, transmitted by the server device 400, may be in the form of a short message service (SMS) message, an electronic mail (email) message, a multimedia message service (MMS) message, an instant message (IM), a telephone call, and/or a message (e.g., an icon such as, for example, an interactive icon) on a multimedia display device (e.g., a television or a computer monitor).

Process 600 may also include providing access to the stored media items (block 630). It should be understood that access the transcoded media item may be provided at the same time or sometime after access is provided to the media item. For example, server device 400 may provide access to the media item before any transcoding of the media item. Additionally, or alternatively, access to the media item and/or the transcoded media item may be provided to the user prior to access to the media items being provided to another user. Server device 400 may allow one or more users to browse and/or search the stored media items. For example, server device 400 may receive a search request for the stored media items, and provide access to the stored media items. The search request may be based on information associated with the stored media items, such as the metadata associated with the stored media items.

Server device 400 may also provide restricted access and/or unrestricted access to the media item. In one instance, the user may transmit information identifying users with which the user may desire to share the media item. For example, the information may identify an individual user or a group of users. Server device 400 may restrict access to the media item based on the information identifying the users. In another instance, the user may not provide information to restrict access to the media item and, accordingly, server device 400 may provide unrestricted access to the media item.

Figure 8:
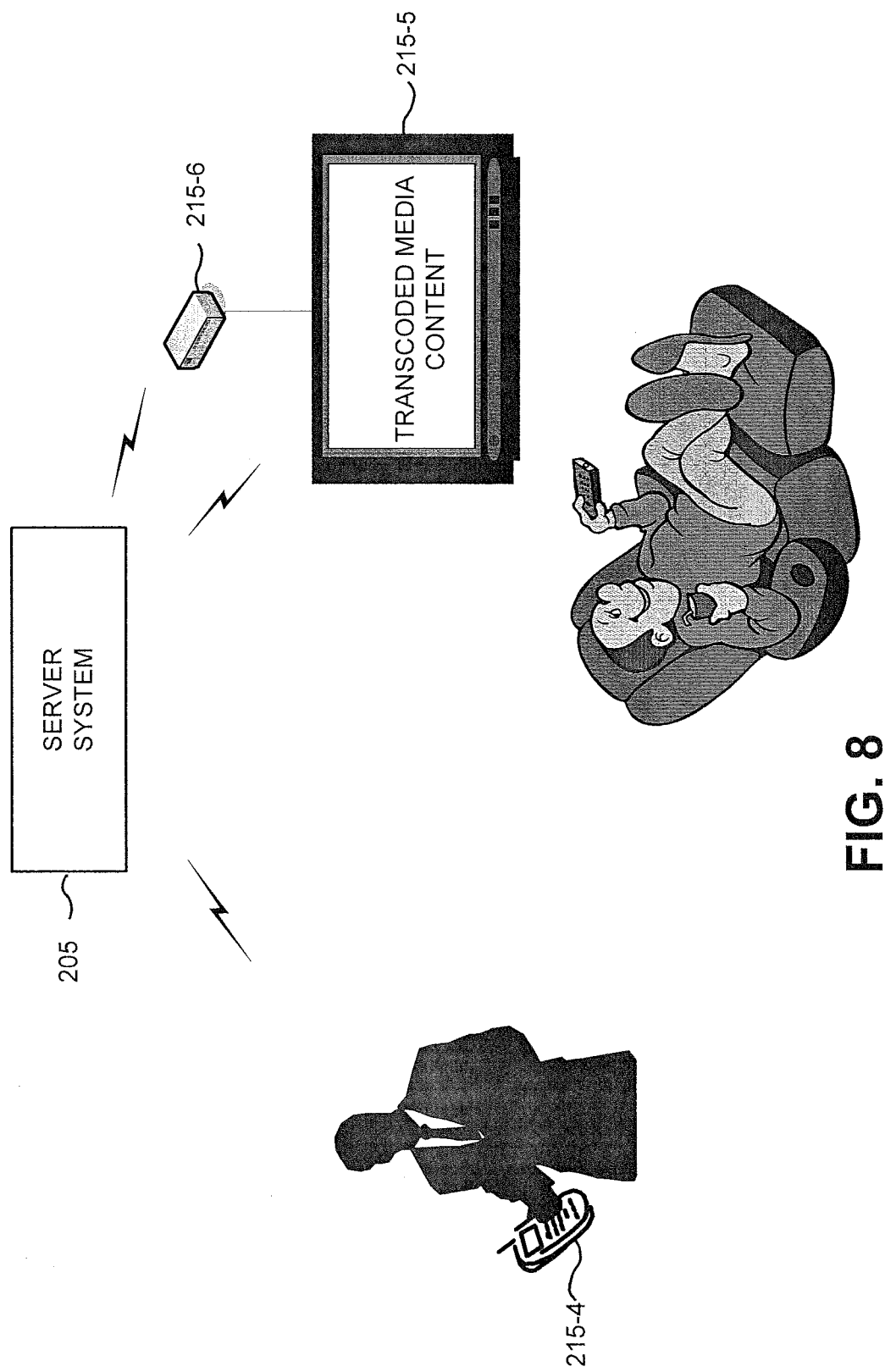
FIG. 8 illustrates an example of the processing described with respect to FIGS. 6 and 7.

FIG. 8 illustrates an example of the processing described in FIGS. 6 and 7. As illustrated, a user may transmit a media item, in a first format, to server system 205 using user device 215-4. In one instance, the user may desire to share the media item with another user, or may desire to access the media item using another user device 215. In one instance, the user may transmit information that causes server system 205 to restrict access to the media item and/or transcoded media items to one or more users.

Server system 205 may determine and assign a transcoding priority to a transcoding job request associated with the media item, select the media item, from among multiple media items, for transcoding based on the assigned transcoding priority, transcode the media item to a number of different formats, and store the media item and the transcoded media items, in accordance with a process described herein. In one example, server system 205 may notify the user when the media item is transcoded. For example, server system 205 may transmit a message (e.g., SMS, email, MMS, etc.) and/or cause a telephone call to be placed to user device 215-4. Server system 205 may, additionally, or alternatively, transmit a message and/or cause a telephone call to be placed to another user device 215 associated with the user. For example, server system 205 may transmit a message to user device 215-5 (e.g., a television) or user device 215-6 (e.g., a set-top box) of the user. In one instance, the message may be presented to the user in the form of an interactive icon.

The transcoded media items may be accessed using a device that supports a different format than a format associated with user device 215-4. The device may also be different than user device 215-4. For example, the user may access the server system 205, using user device 215-5 and/or user device 215-6, to receive access to one or more of the transcoded media items. In one instance, the user may use user device 215-6 to access a first transcoded media item. In another instance, the user may use user device 215-5 to access a second transcoded media item. The user may also access the server system 205, using another user device 215 to access a third transcoded media item. Additionally, another user may access the server system 205, using another user device 215, to access another transcoded media item. The transcoded media items may be in different formats. Accordingly, the media item, received in the first format, may be accessed by the user and/or another user in a number of different formats via different devices.

The foregoing description of implementations provides illustration and description, but is not intended to be exhaustive or to limit the implementations to the precise form disclosed. Modifications and variations are possible in light of the above teachings or may be acquired from practice of the invention. For example, while series of blocks have been described with regard to FIGS. 6 and 7, the order of the blocks may be modified in other implementations consistent with the principles of the invention. Further, non-dependent blocks may be performed in parallel.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

Further, certain portions, described herein, may be implemented as "component" that performs one or more functions. This component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the articles "a" or "an" are intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a server device, a media item from a user device associated with a user, the received media item being received in a first format, and wherein the received media item is to be transcoded into a plurality of formats based on a transcoding priority;
   determining, by the server device, the transcoding priority, to be associated with transcoding of the received media item, based on information regarding whether there is a pending transcoding job request for the user, information associated with the received media item, and information associated with the user, and
   wherein the information associated with the user comprises:
      at least two of a frequency of usage of the server device by the user, a quantity of services associated with a service provider to which the user subscribes, a recency of usage of the server device by the user, or a location from which the user transmitted the media item; and
   wherein determining the transcoding priority further comprises:
      determining the transcoding priority based on at least one of the frequency of usage, the quantity of services, the recency of usage, or the location;
   selecting, by the server device and based on the transcoding priority and at least one of the information associated with the received media item or the information associated with the user, the received media item, from among a plurality of media items, associated with a plurality of users, to be transcoded;
   transcoding, by the server device, the selected media item, from the first format, to transcoded media items in the plurality of formats, a first transcoded media item, of the transcoded media items, being in a second format, of the plurality of formats, and a second transcoded media item, of the transcoded media items, being in a third format, of the plurality of formats, where the first format, the second format, and the third format are different formats; and providing, by the server device, access to the received media item and the transcoded media items.

2. The method of claim 1, where the information associated with the user includes a quantity of media items received from the user, and wherein the determining the transcoding priority further comprises:
   determining whether the quantity of media items is less than or equal to a first threshold;
   assigning a first transcoding priority to the transcoding of the received media item when the quantity of media items is less than or equal to a first threshold; and
   assigning a second transcoding priority to the transcoding of the received media item when the quantity of media items is greater than the first threshold, where the first transcoding priority is higher than the second transcoding priority.

3. The method of claim 1, where the information associated with the received media item includes a size of the received media item, and
   where determining the transcoding priority comprises determining the transcoding priority based on the size of the received media item.

4. The method of claim 1, where the information associated with the user includes the frequency of usage of the server device by the user; and
   where selecting the received media item comprises:
      determining that the frequency of usage is greater than a second frequency of usage by a second user, of the plurality of users; and
      selecting, based on the frequency of usage being greater than the second frequency of usage, the received media item prior to selecting a second media item, received from the second user.

5. The method of claim 1, where the information associated with the user includes the quantity of services, associated with a service provider, to which the user subscribes; and
   where selecting the received media item comprises:
      determining that the quantity of services to which the user subscribes is greater than a second quantity of services to which a second user, of the plurality of users, subscribes; and
      selecting, based on the quantity of services being greater than the second quantity of services, the received media item prior to selecting a second media item, associated with the second user.

6. The method of claim 1, where the information associated with the user includes information relating to one or more devices associated with the user,
   the method further comprising:
      identifying the plurality of formats based on the information relating to the one or more devices.

7. A system, comprising:
   a non-transitory storage device for storing data; and
   one or more server devices, wherein each of the one or more service devices includes a processor, and wherein the one or more server devices is configured to:
      receive a media item from a device, the media item being received in a first format associated with the device,
      determine a transcoding priority to be associated with transcoding of the received media item based on information regarding one or more transcoding job requests for one or more other media items received from a user of the device, information associated with the received media item, and information associated with the user of the device, and
   wherein the information associated with the user comprises:
      at least two of a frequency of usage of the one or more server devices by a user, a quantity of services associated with a service provider to which the user subscribes, a recency of usage of the one or more server devices by the user, or a location from which the media item was received; and
   wherein the one or more server devices is further configured to:
      determine the transcoding priority based on at least one of the frequency of usage, the quantity of services, the recency of usage, or the location,
      select, based on the transcoding priority and at least one of the information associated with the received media item or the information associated with the user, the received media item, from among a plurality of media items, associated with one or more users, to be transcoded,
      transcode the selected media item, from the first format, to a transcoded media item in a second format, the second format being different than the first format,
      store the transcoded media item in the storage device, and
      provide access to the received media item and the transcoded media item.

8. The system of claim 7, where the information associated with the received media item includes a duration of the media item, and where the one or more server devices are to determine the transcoding priority based on the duration of the media item.

9. The system of claim 8, where the one or more server devices are further to:
   determine that the duration of the media item is greater than a duration of a second media item, received from a second user of the one or more users, and
   determine a second transcoding priority to be associated with transcoding of the second media item,
   where the second transcoding priority is higher than the transcoding priority based on the duration of the media item being greater than the duration of the second media item.

10. The system of claim 7, wherein, when determining the transcoding priority, the one or more server devices are further to:
    determine whether the one or more transcoding job requests are pending, and
    assign the transcoding priority to a transcoding job request associated with the received media item, based on a result of determining whether the one or more transcoding job requests are pending.

11. The system of claim 10, where the one or more server devices are to:
    determine a transcoding priority assigned to a pending job request of the one or more transcoding job requests, and
    assign the transcoding priority to the transcoding job request, based on a result of determining the transcoding priority assigned to the pending transcoding job request.

12. The system of claim 11, wherein, when assigning the transcoding priority to the transcoding job request, based on a result of determining the transcoding priority assigned to the pending transcoding job request, the one or more server devices are further to:
    assign a third transcoding priority when the transcoding priority assigned to the pending transcoding job request matches the third transcoding priority, or
    assign a second transcoding priority when the transcoding priority assigned to the pending transcoding job request does not match the third transcoding priority, wherein the second priority is higher than the third priority and lower than the first priority.

13. The system of claim 10, wherein, when transcoding the received media item, the one or more server devices are further to:
transcode the received media item, from the first format, to a plurality of transcoded media items in a plurality of formats, wherein the plurality of formats are identified based on the information associated with the user.

14. A device, comprising:
a non-transitory memory configured to store instructions; and
one or more processors configured to execute the instructions stored in the non-transitory memory to:
receive a media item from a user device associated with a user, the media item being received in a first format, and wherein the received media item is to be transcoded into a plurality of formats based on a transcoding priority,
determine the transcoding priority to be associated with transcoding of the received media item based on information associated with the received media item and information associated with the user, and
wherein the information associated with the user comprises:
at least two of a frequency of usage of the device by the user, a quantity of services associated with a service provider to which the user subscribes, a recency of usage of the device by the user, or a location from which the media item was received; and
wherein determining the transcoding priority comprises:
determining the transcoding priority based on at least one of the frequency of usage, the quantity of services, the recency of usage, or the location, assign the transcoding priority to the received media item,
select the received media item, from a plurality of media items with assigned transcoding priorities, based on the transcoding priority assigned to the received media item,
transcode the selected media item from the first format, to transcoded media items in the plurality of formats, a first transcoded media item, of the transcoded media items, being in a second format, of the plurality of formats, and a second transcoded media item, of the transcoded media items, being in a third format, of the plurality of formats, wherein the first format, the second format, and the third format are different formats,
store the transcoded media items in the memory, and
provide access to the received a media item and the transcoded media items.

15. The device of claim 14, where the information associated with the received media item includes a size of the received media item, and where the one or more processors are further to:
receive a second media item from a second user device associated with another user,
determine a second transcoding priority to be associated with transcoding of the received second media item, where the second transcoding priority corresponds to the transcoding priority assigned to the received media item, and
transcode the received media item prior to transcoding the received second media item, based on a size of the received second media item being greater than the size of the received media item.

16. The device of claim 14, where the received media item includes at least one of: one or more image files, one or more video files, or one or more audio files.

17. The device of claim 14, where the one or more processors are further to:
receive a second media item from a second user device associated with another user,
determine a second transcoding priority to be associated with transcoding of the received second media item, where the second transcoding priority is higher than the transcoding priority assigned to the received media item, and
transcode the received media item prior to transcoding the received second media item, based on the information associated with the user.

18. The device of claim 14, where the plurality of formats is based on at least one of the information associated with the user, or information relating to transcoding formats maintained by the device.

19. The device of claim 14, where the one or more processors are further to:
identify a pending transcoding job request for the user, and
determine the transcoding priority to be associated with transcoding of the received media item based on a transcoding priority associated with the pending transcoding job request.

* * * * *